United States Patent
Wooldridge et al.

(10) Patent No.: US 6,836,527 B1
(45) Date of Patent: Dec. 28, 2004

(54) METHOD AND APPARATUS FOR DETECTING AND COUNTING ARTICLES

(75) Inventors: Donald R. Wooldridge, Dunkirk, MD (US); Mark Richard, Pasadena, MD (US); Scott B. Yoder, Upper Marlboro, MD (US)

(73) Assignee: Batching Systems, Inc., Prince Frederick, MD (US)

( * ) Notice: Subject to any disclaimer, the term of this patent is extended or adjusted under 35 U.S.C. 154(b) by 0 days.

(21) Appl. No.: 10/774,640

(22) Filed: Feb. 6, 2004

(51) Int. Cl.[7] .............................................. G06M 11/00
(52) U.S. Cl. .............................. 377/53; 377/6; 250/221; 250/222.1
(58) Field of Search .............................. 377/6, 7, 8, 53; 250/221, 222.1

(56) References Cited

U.S. PATENT DOCUMENTS

| | | | |
|---|---|---|---|
| 3,618,819 A | * | 11/1971 | Blackburn et al. ............. 221/2 |
| 4,675,520 A | | 6/1987 | Harrsen et al. .......... 250/222.2 |
| 4,982,412 A | | 1/1991 | Gross ............................. 377/6 |
| 5,313,508 A | | 5/1994 | Ditman et al. ................. 377/6 |
| 5,454,016 A | | 9/1995 | Holmes ......................... 377/6 |

* cited by examiner

Primary Examiner—Margaret R. Wambach
(74) Attorney, Agent, or Firm—Crowell & Moring LLP

(57) ABSTRACT

An improved method for counting irregular or unsymmetrical shaped articles that allows greater precision and provides enhanced features over current counting devices and methods. The method improves upon current devices and methods by providing a more precise volume for each article by using actual cross sectional areas of articles. The improved method also allows the user to count broken or incomplete articles as "partial" volumes. These partial volumes may be added to one another to give a precise total batch volume. The actual cross sectional areas may also be used to allow the user to display three dimensional adaptations of each article counted. Because this information is stored, the articles may be displayed at any time after the articles are scanned. The improved method also allows a user to determine the distance between articles, by using the counting device, and, using this information, adjust the feed rate of the device to an optimum feed rate.

6 Claims, 6 Drawing Sheets

METHOD AND APPARATUS FOR DETECTING AND COUNTING ARTICLES

BACKGROUND OF THE INVENTION

1. Field of the Invention

The present invention pertains in general to a method and apparatus for counting a stream of articles as they are transported or allowed to fall through a passageway. More particularly, the invention pertains to a method and apparatus for counting irregularly shaped articles using a pair of crossed light beams at a sensing plane in the above referenced passageway. Most particularly, the invention pertains to an improved method and apparatus for counting irregularly shaped articles that allows counting the articles by volumes and partial volumes, three dimensional imaging of the articles being counted, and ability to adjust to the most efficient counting speed.

2. Description of the Related Art

Using a beam of light to count articles as they pass through a passageway has been known for many years. For example, U.S. Pat. Nos. 3,618,819; 4,982,412; and 4,675,520 all disclose article counters that employ a beam of light across a passageway wherein the articles, as they traverse the passageway, in some manner, block the beam of light. This, in turn, provides information that enables counting of number of articles. However, these article counters did not accurately count or sense unsymmetrical articles.

Several years ago, an improved article counting apparatus and method was developed to address these deficiencies. U.S. Pat. Nos. 5,313,508 and 5,454,016 disclose a counting apparatus and method for counting articles that employs a pair of light sources that provide light beams that are substantially perpendicular to one another along planes of a passageway through which the articles being counted traverse. As an article passes the light sources, each source provides a separate sensing of the article. Therefore, symmetry of an unsymmetrical article is irrelevant, as one angle of light source will "sense" the greater surface area portion of the article, allowing it to be accurately counted. This apparatus and method improved upon the systems noted above by providing a system that accurately counted unsymmetrical articles traversing a passageway.

However, while the system described above allows for more accurate counting of unsymmetrical articles, it still possesses significant limitations in counting articles. For instance, the system does not allow for counting and batching of articles that comprise different volumes, for example, articles that are broken. The above system also does not allow for any type of visualization of the articles being counted. Finally, the system only allows for rudimentary estimate of the appropriate feed rate of articles to be counted. For instance, if the feed rate for items is too fast, providing for insufficient space between the articles being counted, the first article in a "new" batch, could be damaged by the gate which closes between batches.

Therefore, it is desired to provide an improved apparatus and method for counting articles that allows unsymmetrical articles to be counted by volume or partial volume, allows the articles to be three dimensionally imaged as the articles traverse the apparatus, and allows the apparatus to sense the most efficient throughput counting speed for the particular articles being counted.

SUMMARY OF THE INVENTION

The present invention comprises improvements to the methods and apparatuses disclosed in U.S. Pat. Nos. 5,313,508 and 5,454,016 which are incorporated by reference herein.

Accordingly, it is an object of this invention to provide a device and method that allows unsymmetrical articles to be counted by volume and partial volume.

It is a further object of this invention to provide a device and method that allows counted articles to be visually displayed, either immediately after the articles pass through the counter or at some later time.

A still further object of this invention is to provide a device and method that calculates the distance between unsymmetrical articles being counted, and, using this information, to adjust the feed rate of said articles to a selected feed rate.

This invention accomplishes these objectives and other needs related to counting and batching unsymmetrical articles by providing an improved method to count and batch articles of an arbitrary shape and size. The articles travel through a passageway past at least a pair of orthogonally positioned light sources and respective orthogonally positioned light detectors. These light sources and detectors are positioned to provide crossing light beams that extend across the passageway at a detection station. The light sources are operated alternately as the articles pass through the detection station. This allows the user to obtain a plurality of article scans by sensing the quantity of light that is detected by each light detector and providing electrical signals representative of the amounts of light received by the respective light detectors. These electrical signals are then stored along with the times corresponding with each signal. An actual volume is obtained for each article and the actual volume is compared to a predetermined volume for each article to obtain a count portion. This allows the user to count articles that are broken or not whole, complete articles. Finally, the count portions of each article are added together to obtain a total batch volume. This total batch volume should be more of an exact batch volume than those obtained in previous counting methods due to using actual volumes versus estimated volumes.

Other embodiments of the method include steps related to using cross sectional area scans of the articles in order to provide a three dimensional view of scanned articles on some type of screen as well as measuring the distance between articles and using this information to vary the feed rate of the articles to an optimum rate.

BRIEF DESCRIPTION OF THE DRAWINGS

The accompanying drawings, which are incorporated in and constitute a part of the specification, illustrate embodiments of the invention, and, together with the description, serve to explain the principles of the invention.

DESCRIPTION OF THE PREFERRED EMBODIMENT

Figure 1D:
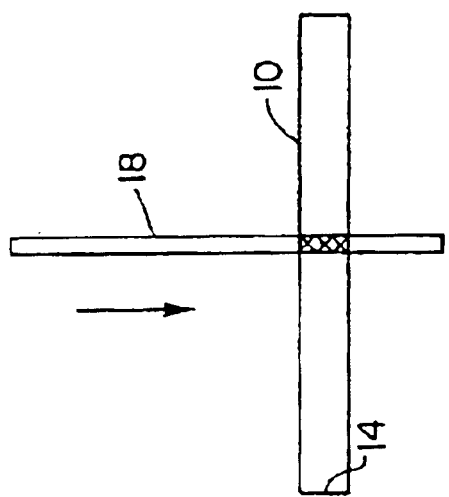
FIG. 1D is a side view looking across a passageway and in the direction of a sensing plane of a prior art device.

The invention, as embodied herein, comprises an improved method for counting irregular or unsymmetrical shaped articles that allows greater precision and provides enhanced features over current counting devices and methods. The method improves upon current devices and methods by providing a more precise volume for each article by using actual cross sectional areas of articles. The improved method also allows the user to count broken or incomplete articles as "partial" volumes. These partial volumes may be added to one another to give a precise total batch volume. The actual cross sectional areas may also be used to allow the user to display three dimensional adaptations of each article counted. Because this information is stored, the articles may be displayed at any time after the articles are scanned. The improved method also allows a user to determine the distance between articles, by using the counting device, and, using this information, adjust the feed rate of the device to an optimum feed rate.

Referring to the drawings, FIGS. 1A–1D show aspects of the prior art devices disclosed in U.S. Pat. Nos. 5,313,508 and 5,454,016, over which the present invention is an improvement. The FIGs. show a pair of crossed light beams with associated detectors. An article 18 falls through a passageway 14 across a sensing plane or detection station 10. A first radiant energy source 30 is disposed to emit an elongated first radiant energy beam to extend across a sensing plane 32 in a first direction. First radiant energy source 30 is positioned to cause the first beam to impinge upon and to be received by a first radiant energy detector 34 that is positioned directly across sensing plane 32 from first radiant energy source 30.

A second radiant energy source 36 is disposed at substantially a 90 degree angle to first radiant energy source 30 to emit a second elongated radiant energy beam to extend across sensing plane 32 in a direction perpendicular to the direction of the first beam. Second radiant energy source 36 is positioned to cause the second beam to impinge upon and to be received by a second radiant energy detector 38. Therefore, the energy sources 30, 36 are oriented so they don't impinge upon the related energy detector 34, 38.

Figure 1C:
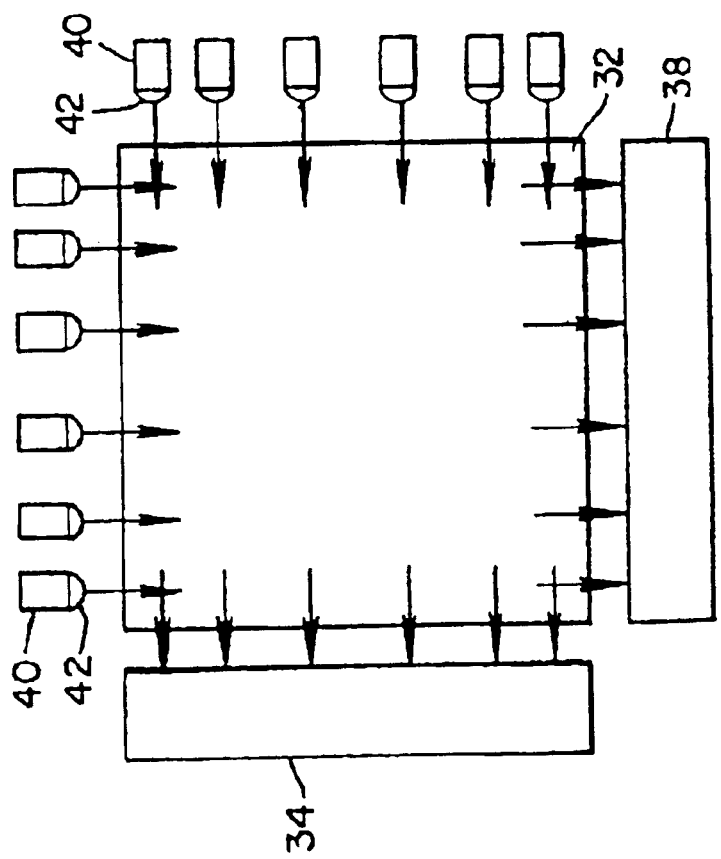
FIG. 1C is a prior art view similar to FIGS. 1A and 1B, showing a series of light emitting diodes as the light sources at the sensing plane.
Figure 1B:
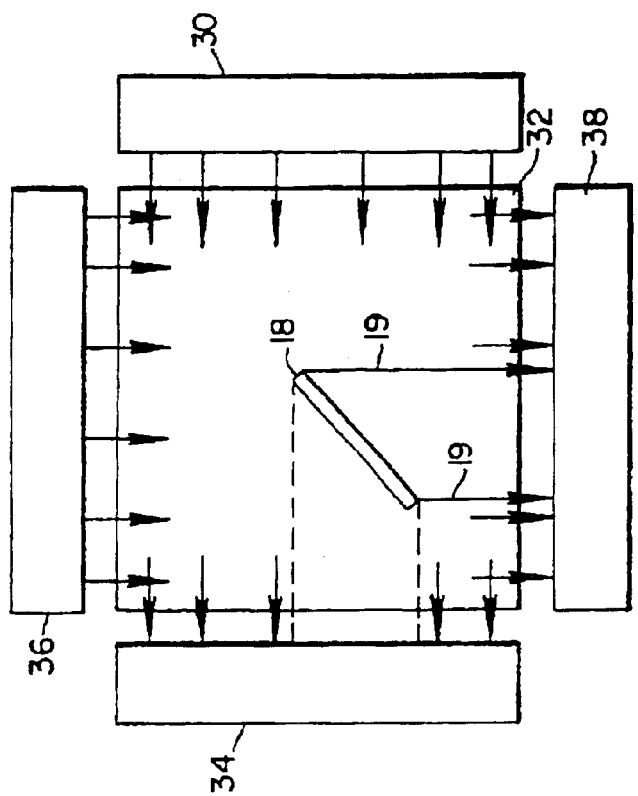
FIG. 1B is a prior art elevational view similar to FIG. 1A, showing an article as it passes through the sensing plane.
Figure 1A:
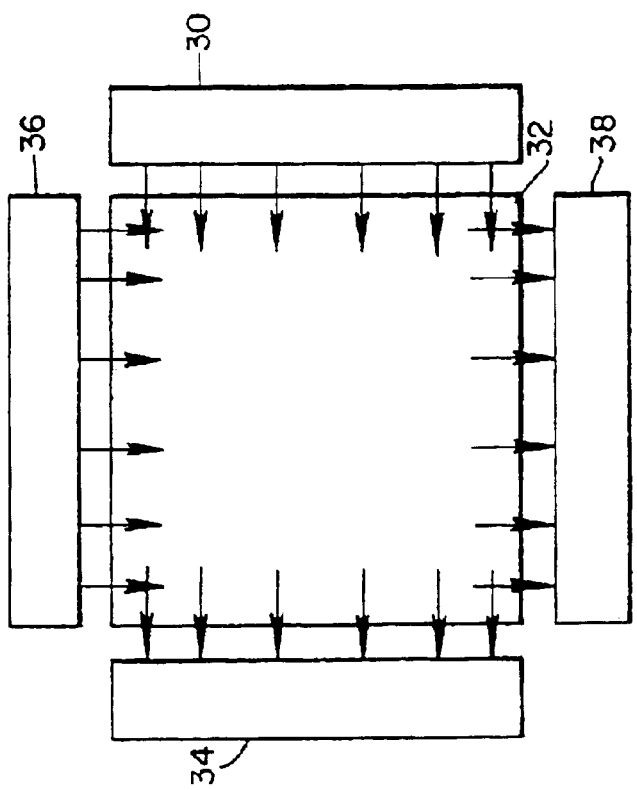
FIG. 1A is a prior art elevational view at an article sensing plane utilizing a dual light source and dual light sensor arrangement.

The respective radiant energy sources 30, 36 can be numerous types, such as diodes 40 that emit light as shown in FIG. 1C. However, the radiant energy sources 30, 36 can also be neon tubes, fluorescent tubes, stroboscopic gas discharge devices, or other devices that provide radiant energy known by those skilled in the art. Hereinafter, the radiant energy sources 30, 36 will be referred to as light sources for convenience. The structural components of the devices that may be employed are more fully described in the patents referenced above, and previously incorporated herein. However, it should be noted that the invention described herein may allow substitutes of certain structural components. For example, the microcontroller described in said patents may be replaced by an off the shelf microcontroller, such as a controller manufactured by Mircro/Sys, part number SBC-0486 microcontroller board.

The present improved method, as described herein, may be employed using the prior art devices with the elements described above or using similar type, dual-view or multiview type light source sensing systems. As described above, articles to be counted are passed by at least a pair of orthogonally positioned light sources and respective orthogonally positioned light detectors that extend at a detection station or sensing plane. The light sources are alternately operated as the articles pass through the detection station, thereby, obtaining a plurality of article scans by sensing the quantity of light that is detected by each light detector as each light source is operated and providing electrical signals representative of the amounts of light received by the respective light detectors. The respective electrical signals and the times corresponding with each signal are stored in a personal computer or other storage device.

Figure 2:
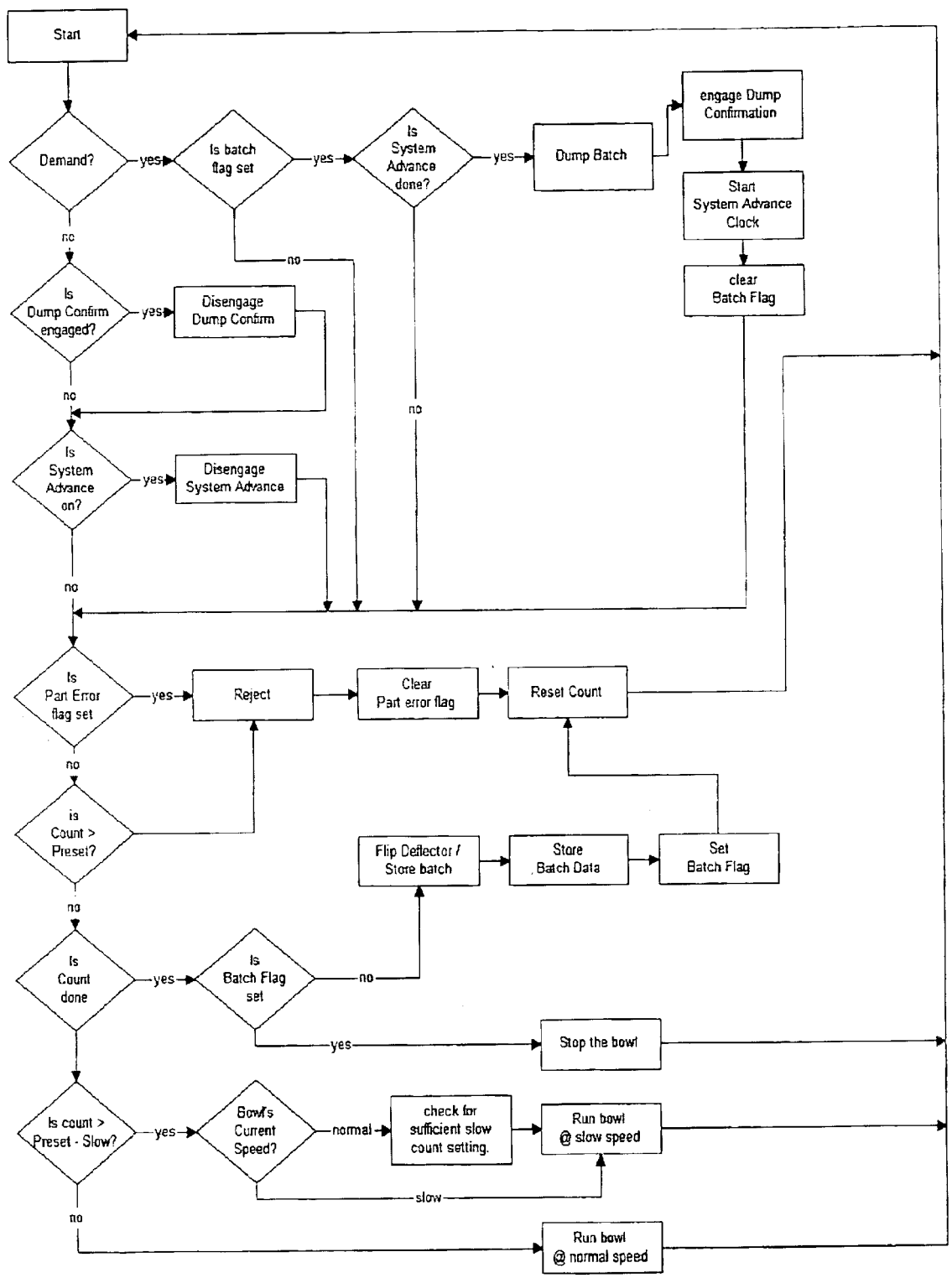
FIG. 2 is a flow chart showing several steps in a run cycle for use in a system in accordance with the present invention.
Figure 3:
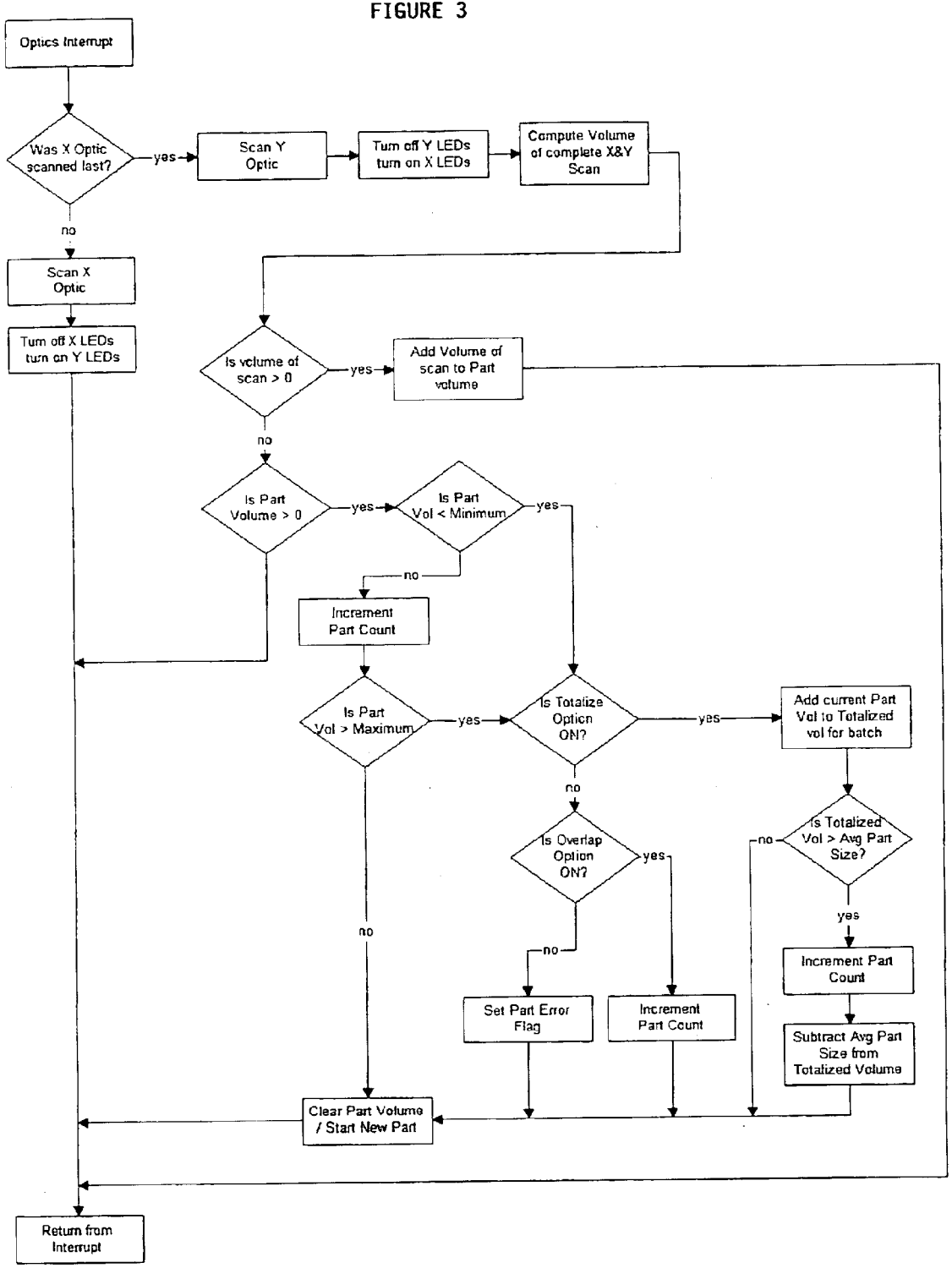
FIG. 3 is a flow chart showing several steps in an optics interrupt subroutine for use in a system in accordance with the present invention.

FIGS. 2 and 3 are flow diagrams that describe the operation of one embodiment of the present improved method. FIGS. 2 and 3 may be compared to FIGS. 12 and 15 in U.S. Pat. No. 5,454,016, referenced above, to more specifically identify improvements of the present invention.

Figure 4:
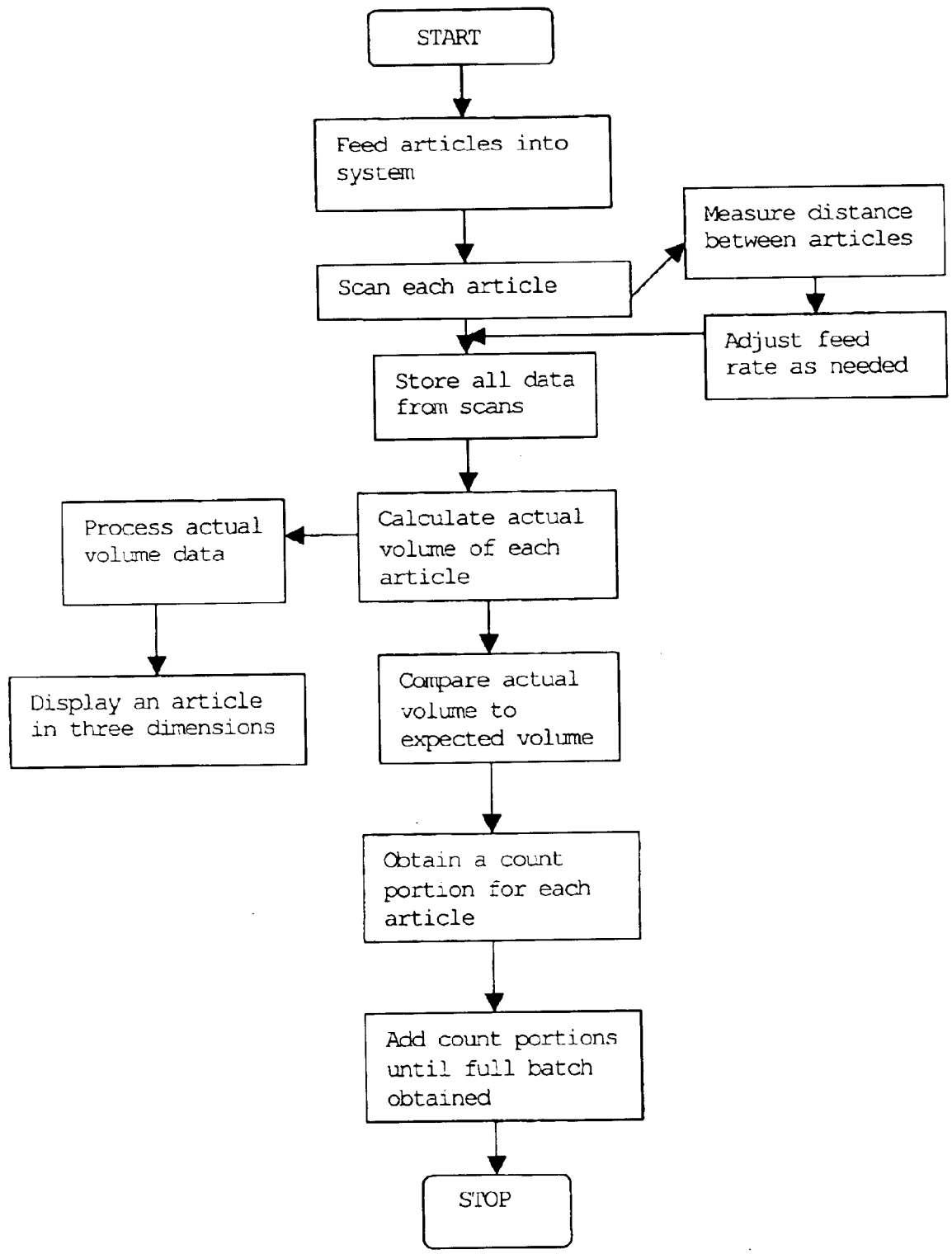
FIG. 4 is a general block diagram depicting the general steps of an embodiment of the method of the present invention.

Referring now to FIGS. 2–4, information from the scanning of articles described above is used to obtain an actual volume of each article. This is accomplished by using the scans to obtain numerous cross sectional areas of each article as it passes through the detection station. This is akin to taking a "picture" of numerous "slices" of each article. The distance between each scan is calculated. This is done by using the light source device scan rate and the gravity constant to determine the rate an article is "dropping" past the source. The cross sectional areas for each article are then multiplied by the distance to obtain cross-sectional volumes for each article. Finally, these cross sectional volumes are added together to obtain a total volume for each article that has passed through the device.

After a total volume for each article is obtained, this value is compared to a predetermined volume for each article. The predetermined volume is normally the volume of an expected whole article of the type of articles that is being measured. If the volume of the article being scanned is less than the predetermined volume, it is counted as a portion of one article. As counting continues, all portions are added together. When the portions add up to the predetermined volume, then another "whole article" is added to the count. When the count meets the desired total batch volume, then the device switches to a new batch count. This allows the user to obtain an exact total batch volume, made up of whole and piece "parts".

In another embodiment of the present invention, the light sources are used to measure the distance between articles entering the passageway. This is accomplished by determining the time from a final scan of one article to a first scan of another article. In this manner, the user may calculate the feed rate (i.e. the distance between the articles) of articles passing through the device. To optimize the operation of a counting and batching device, the feed rate of articles should be as fast as possible, without the gates of the device batting the articles in such a manner to break or fracture the articles. By calculating the feed rate as described above, the user knows the exact distance between the articles passing through the device. This allows the user to optimize the feed rate to a predetermined rate so that there is the optimum distance between the articles as they enter the device so that the final article in a batch is not "batted" to forcefully by the gate, while minimizing the distance between the articles.

In yet another embodiment of the present invention, the cross sectional areas and volumes of articles are sent to a data processor, which, in turn, is attached to a visualization screen. In a preferred embodiment, the processor will be a personal computer and the visualization screen is a computer monitor. The cross sectional areas and volumes are processed to allow a three dimensional representation of each article to be displayed on the screen. In a preferred embodiment, the raw and processed data will be stored on the personal computer to allow a user to see either an immediate three dimensional representation of each article or view the articles of a particular batch at a later time.

Figure 5:
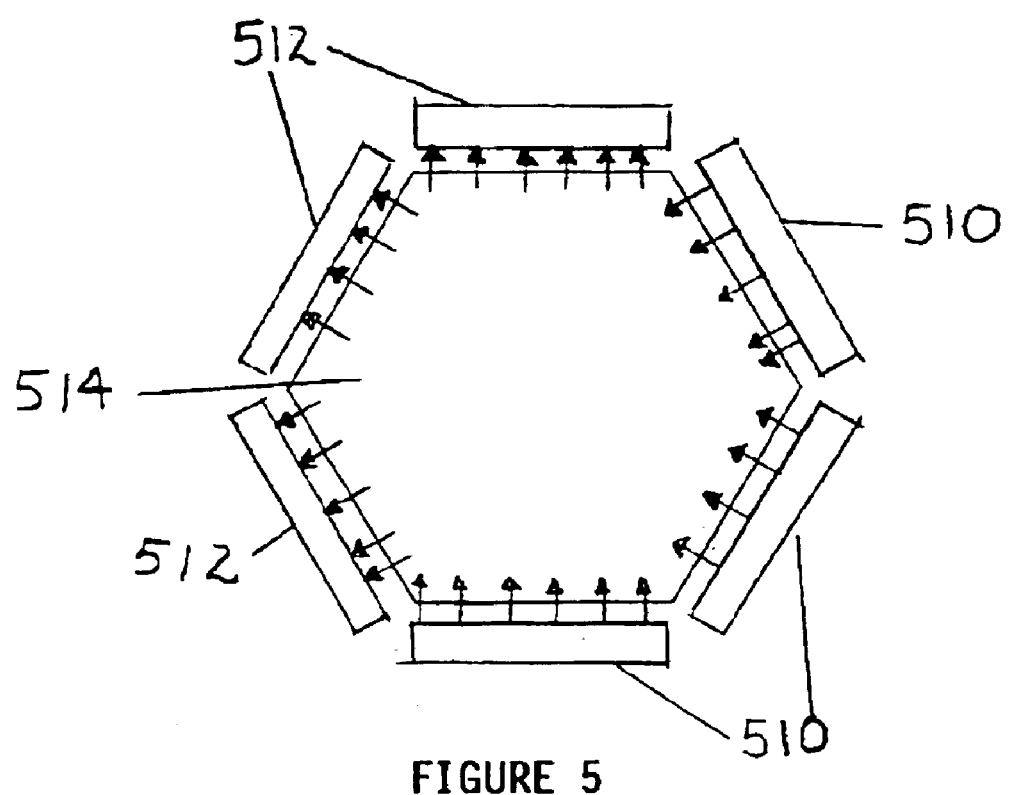
FIG. 5 is an elevational view of an embodiment of the present invention showing a sensing plane utilizing a mulitview light source and multi light sensor arrangment.

Referring to FIG. 5, the present invention may also be practiced using a multi-view light source device comprising greater than a pair of light sources 510 and respective light detectors 512 that extend at the sensing plane 514. FIG. 5 depicts three light sources 510 having three respective light detectors 512 directly across from said light sources 510 to complete a hexagonal shaped device across the sensing plane 514. While this configuration shows three pairs of light sources 510 and light detectors 512, any desired number of light source 510 and light detector 512 pairs may be employed in the present invention. Increasing the number of light sources 510 and light detector 512 pairs may enable a user to obtain an even more accurate scan of three dimensional objects when compared with previous devices.

What is described are specific examples of many possible variations on the same invention and are not intended in a limiting sense. The claimed invention can be practiced using other variations not specifically described above.

What is claimed is:

1. A method of detecting and counting articles of arbitrary size, shape, and orientation that travel along a passageway, comprising:

passing articles past at least a pair of orthogonally positioned light sources and respective orthogonally positioned light detectors that extend at a detection station;

operating the light sources alternately as the articles pass through the detection station;

obtaining a plurality of article scans by sensing the quantity of light that is detected by each light detector as each light source is operated and providing electrical signals representative of the amounts of light received by the respective light detectors;

storing the respective electrical signals and the times corresponding to each signal;

obtaining an actual volume of each article;

comparing the actual volume of each article to a predetermined volume for each article to obtain a count portion; and, adding the count portions of each article to obtain a total batch volume.

2. The method of claim 1, wherein the step of obtaining an actual volume comprises:

calculating a cross sectional area for each article during each of the plurality of article scans; calculating a distance articles fall between each of the plurality of article scans; multiplying the cross sectional area by the distance to obtain a cross sectional volume; and, adding the cross sectional volumes of each article together.

3. The method of claim 1, further comprising:

measuring the distance between articles entering the passageway using the light sources; and, varying feed rate of articles to provide a desired distance.

4. The method of claim 2, further comprising:

sending the cross sectional areas for an article to a data processor attached to a visualization screen;

processing the cross sectional areas to allow the cross sectional areas to be displayed on the visualization screen to visually depict the article.

5. The method of claim 1, further comprising:

storing actual volume data to allow future calculation of article size or three-dimensional visualization of articles.

6. An method of detecting and counting articles of arbitrary size, shape, and orientation that travel along a passageway, comprising:

passing articles past greater than a pair of positioned light sources and respective positioned light detectors that extend at a detection station;

operating the light sources alternately as the articles pass through the detection station;

obtaining a plurality of article scans by sensing the quantity of light that is detected by each light detector as each light source is operated and providing electrical signals representative of the amounts of light received by the respective light detectors;

storing the respective electrical signals and the times corresponding to each signal;

obtaining an actual volume of each article;

comparing the actual volume of each article to a predetermined volume for each article to obtain a count portion; and, adding the count portions of each article to obtain a total batch volume.

* * * * *